F. V. DETWILER.
VALVE FOR GAS BURNERS.
APPLICATION FILED MAY 7, 1915.

1,154,177.

Patented Sept. 21, 1915.
5 SHEETS—SHEET 1.

Witnesses

Inventor
Forest V. Detwiler
By John A. Bonnhardt
Attorney

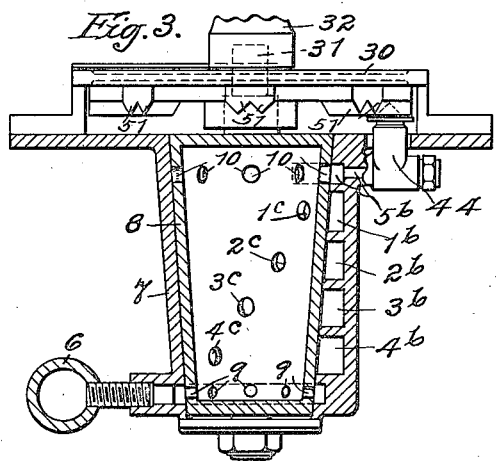
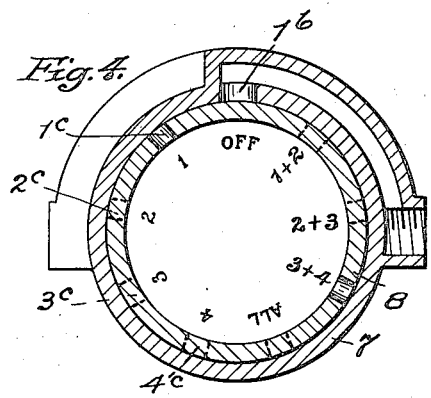
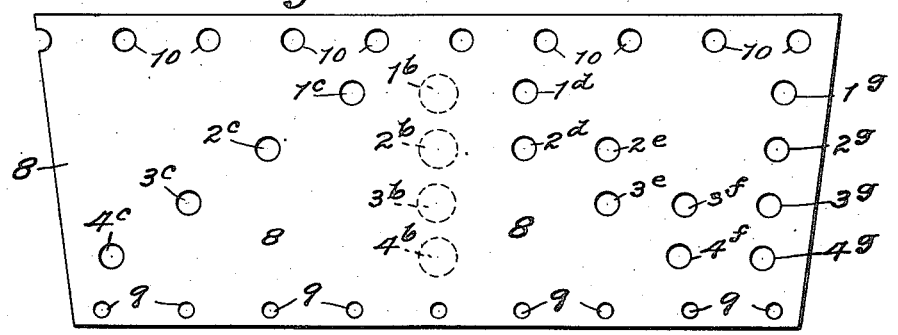

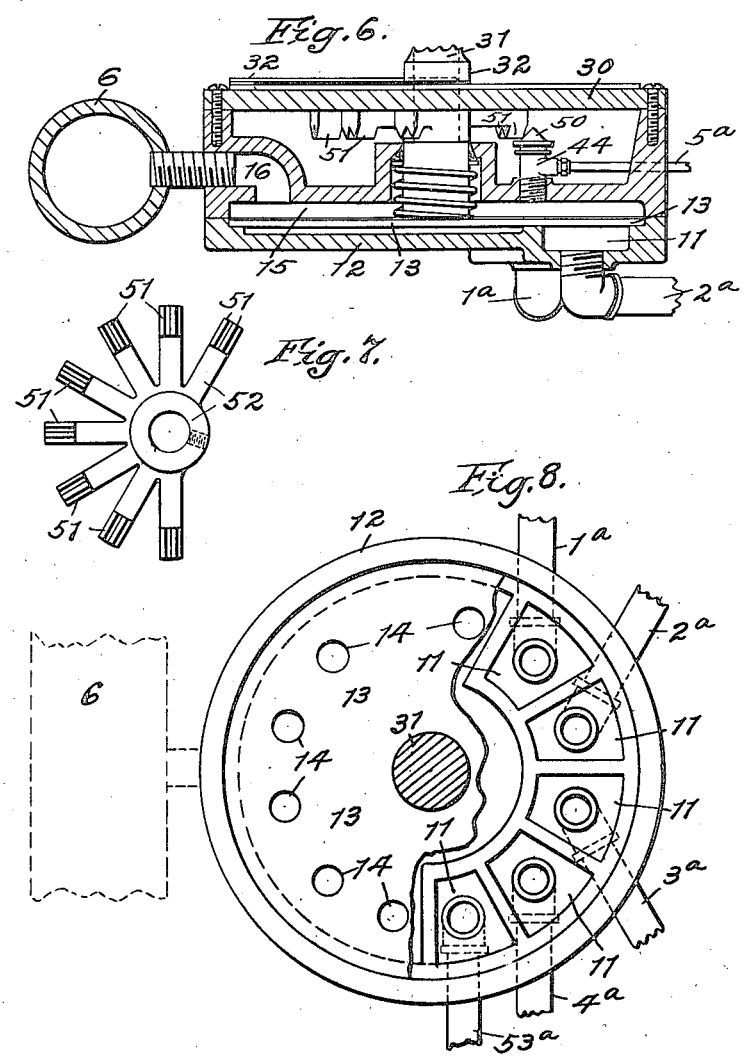

F. V. DETWILER.
VALVE FOR GAS BURNERS.
APPLICATION FILED MAY 7, 1915.
1,154,177.
Patented Sept. 21, 1915.
5 SHEETS—SHEET 4.
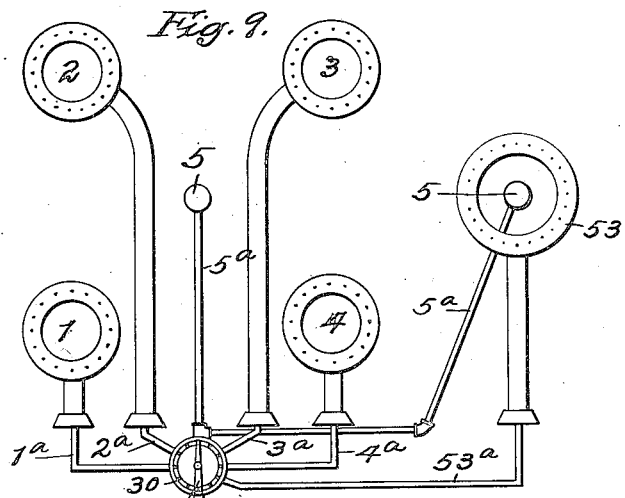
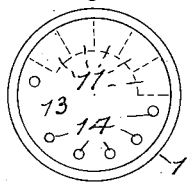 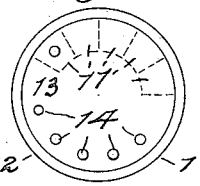 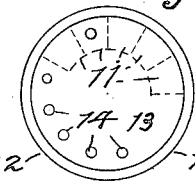 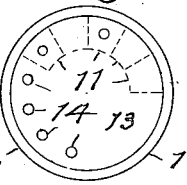 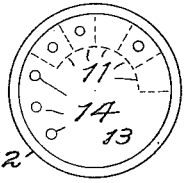
Fig.10.  Fig.11.  Fig.12.  Fig.13.  Fig.14.
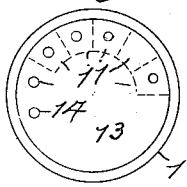 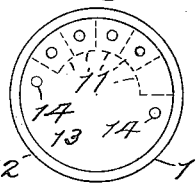 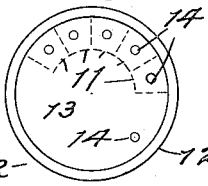 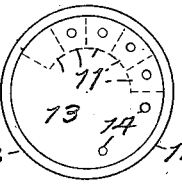 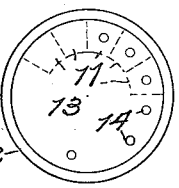
Fig.15.  Fig.16.  Fig.17.  Fig.18.  Fig.19.
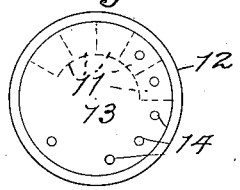 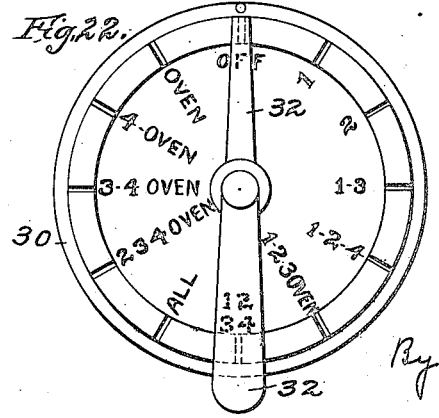 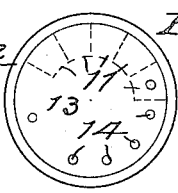
Fig.20.  Fig.22.  Fig.21.
Witnesses:
S. W. Brainard
Inventor
Forest V. Detwiler
By John A. Bommhardt
Attorney

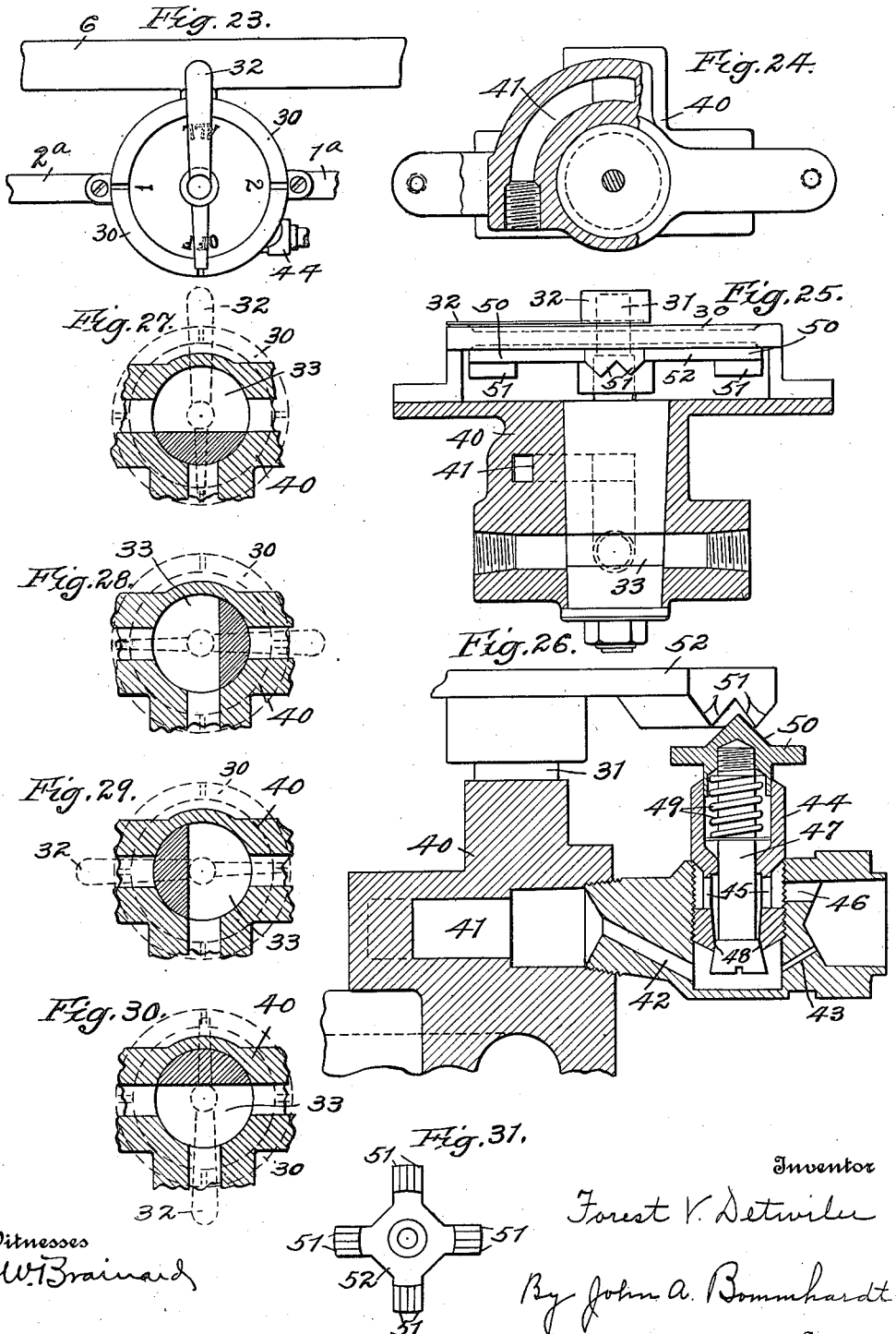

UNITED STATES PATENT OFFICE.

FOREST V. DETWILER, OF GRAND RAPIDS, MICHIGAN.

VALVE FOR GAS-BURNERS.

1,154,177.  Specification of Letters Patent.  Patented Sept. 21, 1915.

Application filed May 7, 1915. Serial No. 26,498.

*To all whom it may concern:*

Be it known that I, FOREST V. DETWILER, citizen of the United States, residing at Grand Rapids, in the county of Kent and State of Michigan, have invented certain new and useful Improvements in Valves for Gas-Burners, of which the following is a specification.

This invention relates to valves for gas burners, and is particularly adapted for use in connection with the supply of gas to the burners of a gas stove.

The object of the invention is to provide improved means for controlling the supply of gas to a plurality of burners, by means of a single valve, so constructed that gas may be supplied to any one or more of the burners, or any combination of one, two or more thereof, with a pilot light connection constantly supplied in all positions of the valve.

The invention may be embodied in various forms, several of which are illustrated in the accompanying drawings.

Figure 1:
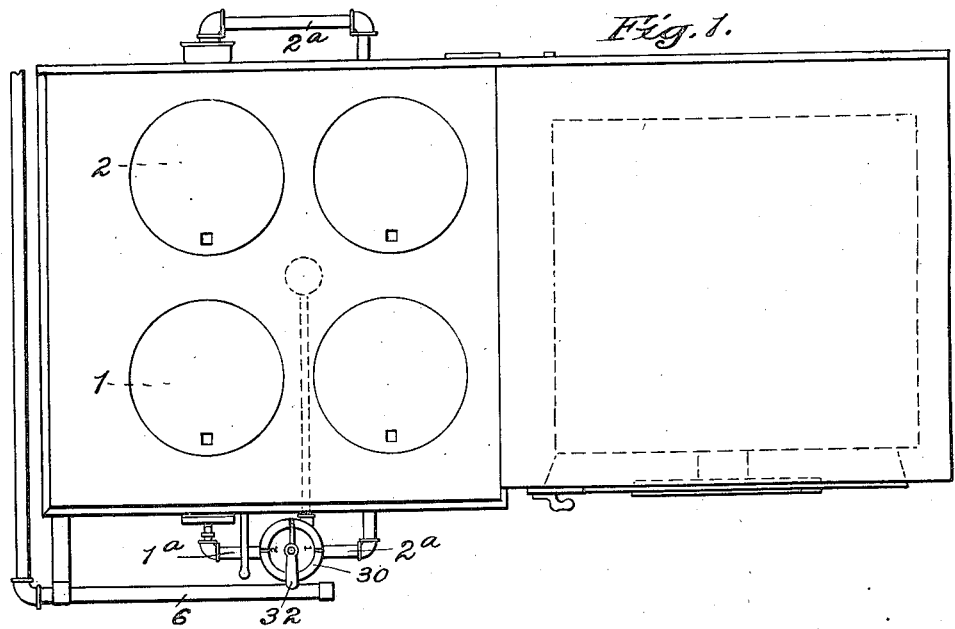
Figure 2:
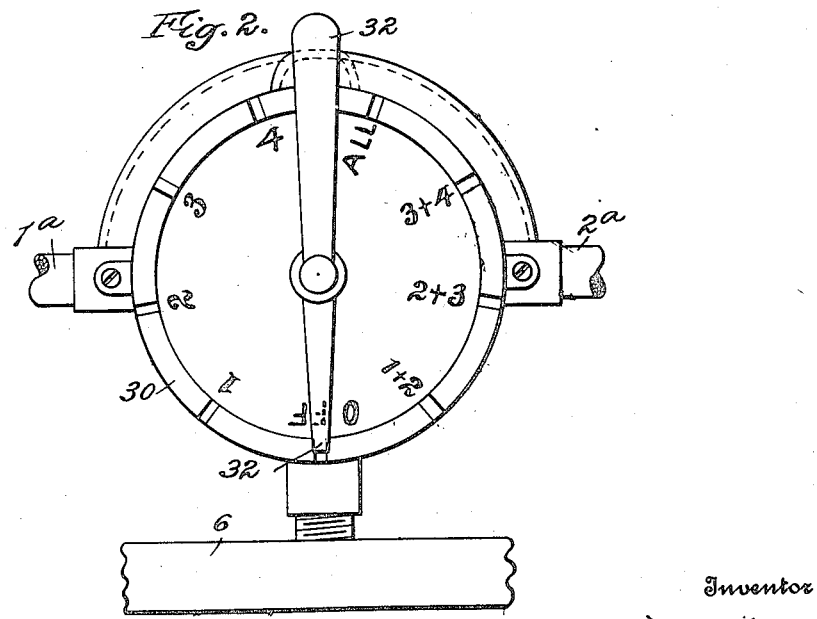

In the drawings, Figure 1 is a plan view of a gas stove to which the valve is applied. Fig. 2 is a plan view of the valve arranged for four burners and various combinations thereof. Fig. 3 is a vertical section of the valve. Fig. 4 is a horizontal section. Fig. 5 is a projection of the valve plug, showing the arrangement of ports. Fig. 6 is a section of a modified form of valve, using a disk instead of a plug. Fig. 7 is a plan of a spider for operating the flash valve. Fig. 8 is a plan, partly broken away, of the valve shown in Fig. 6. Fig. 9 is a plan showing five burners and a disk valve. Figs. 10 to 21 are diagrams of the valve in twelve different positions, embracing possible combinations of five burners. Fig. 22 is a top plan view of the valve having such combinations. Fig. 23 is a plan of a three way plug valve. Fig. 24 is a horizontal section thereof. Fig. 25 is a vertical section thereof. Fig. 26 is a vertical section showing the bypass to the pilot light, and the flash valve therein. Figs. 27, 28, 29 and 30 are sectional views of the three-way valve in different positions. Fig. 31 is a plan of a spider for operating the flash valve.

The valve shown in Figs. 2 to 5 is a combination valve of the hollow plug type, for supplying gas to any one, or two, or all of four burners, or shutting them all off. The valve shown in Figs. 6 to 22, is a modified form, using a flat disk instead of a plug, and the figures show the various combinations that may be obtained by this type of valve.

In the drawings 1, 2, 3 and 4 indicate the burners, and $1^a$, $2^a$, $3^a$, $4^a$ and $53^a$ the gas supply pipes leading thereto. 5 are pilot lights and $5^a$ the pipes thereto. All of these pipes lead from the controlling valve which is connected to the main 6.

Referring especially to Figs. 3, 4 and 5, 7 indicates a hollow valve casing in one side of which are formed a vertical series of passages $1^b$, $2^b$, $3^b$ and $4^b$ having outlet connections to the respective pipes $1^a$, $2^a$, $3^a$ and $4^a$, and these passages correspond in position to a series of holes through the wall of a hollow tapered turning plug valve 8. This valve also has, at the bottom or inlet end, a series of holes 9 one of which communicates at all times, in the respective positions of the valve, with the main 6, and at the upper end the valve has a corresponding series of holes 10 one of which communicates with a passage $5^b$, leading to the pilot connection $5^a$, in all positions of the valve. In the layout shown in Fig. 5 the individual ports for supply to any single burner are indicated at $1^c$, $2^c$, $3^c$ and $4^c$, arranged spirally, or in steps, whereby any single connection can be made. On the other side of the valve the ports are in pairs indicated at $1^d$ and $2^d$, $2^e$ and $3^e$, and $3^f$ and $4^f$, and finally a row of ports $1^g$ to $4^g$ in line for all burners. By this arrangement therefore it is obvious that by turning the plug 8 any one burner, or any one of the combinations shown in Figs. 4 and 5, can be connected.

In the disk valve shown in Figs. 6 to 22, the respective pipes $1^a$, $2^a$, $3^a$, $4^a$ and $53^a$ are tapped into separate compartments 11 in the bottom of a valve casing 12, these compartments being radially arranged, and the valve disk 13 is provided with suitable ports 14 and may be turned to connect one, two or more of the passages 11 with the space 15 above the valve disk, which space has an inlet 16 from the supply main 6.

In the combination shown in Figs. 6 to 22, in addition to the burners 1, 2, 3 and 4, an oven burner 53, having a pilot light, is added. Any combination shown on the dial in Fig. 22 may be obtained, as illustrated in Figs. 10 to 21 inclusive. For example; Fig. 10 shows all burners turned off, while Fig. 13 shows 1 and 3 connected and Fig. 17 shows all the burners turned on. Fig. 21 shows the oven only, in connection.

Each form of valve has a top plate 30 with the different combinations marked thereon, and the stem 31 of each valve is connected to a combined handle and pointer 32 which enables the valve to be turned and the desired combination to be indicated.

In Figs. 23 to 30 a simple three way plug valve is used, the valve being indicated at 33 for connecting one or more of the burners, and in this instance the valve casing 40 has a bypass 41 communicating through a passage 42 and port 43 to the pilot valve connection $5^a$.

In each instance the pilot valve connection has a flash valve shown in section in Fig. 26, comprising a bushing 44 with openings 45 communicating through a port 46 with the pilot line, and in this bushing is a reciprocating valve 47 which seats upwardly against the seat 48 by the lift of a spring 49, and this valve has a cap 50 with a tapered head which may be pressed down by any one of a series of cam teeth or projections 51 at the outer ends of the arms of a spider 52 which is secured to the valve stem, so that when any burner is turned on the valve 47 will be opened and a gush of gas supplied to the pilot burner to produce a flash to light the selected burner or burners. The arrangement of the double teeth or projections 51 at the outer ends of the arms of the spider 52 permits the handle 32 to be turned either right or left, the flash being obtained by the pressing down of the cone-shaped cap 50 for a few seconds after the gas has entered the burner. Thus, by having a plurality of these teeth the burner can be operated as described and lighted. These teeth serve the further purpose of preventing accidental turning of the handle. The number and position of the arms of the spider correspond to the different positions or combinations of the valve. Thus in the three way valve shown in Fig. 23 the spider has four arms as shown in Fig. 31. In Fig. 7, corresponding to the eight combination, the spider has eight arms.

By the means described, or modifications thereof, a selected number of burners may be lighted and used, all controlled by a single valve, which is highly desirable in a stove of the type referred to.

What I claim as new is:

1. The combination of a plurality of main burners and a relatively fixed pilot burner, a main valve having a plurality of ports, one for each main burner, said valve having a by-pass to the pilot burner, a normally closed flash valve controlling said by-pass, and a member on the main valve and movable therewith and having projections corresponding in number to said ports and arranged to engage and open said flash valve as each port is opened.

2. The combination with a main multiple-way valve, of a by-pass, a normally closed flash valve therein, and a spider fixed on the stem of the main valve and movable therewith and having projections corresponding in number and position to the ways therein, and arranged to strike and open the flash valve when any of said ways are opened.

3. A valve comprising a casing having an inlet, and an outlet, a partition dividing the casing into two chambers, said partition having a by-pass extending through the same, a main rotary valve disk in one of said chambers between the inlet and the outlet, and having a port which may be registered with the outlet, a flash valve in the by-pass extending through said partition, and a projection carried by the main valve stem in the other chamber and arranged to strike and open the flash valve when the main valve is opened.

4. A multiple way valve comprising a casing having an inlet, and a series of outlets arranged in an arc, a by-pass communicating with the inlet side of the casing, a flash valve in said by-pass and within the casing, a rotary valve disk in the casing, between the inlet and the outlets and having a circular series of ports one or more of which may be registered with the said outlets, and a spider carried by the rotary valve and having a series of projections arranged to successively strike and open the flash valve as the respective outlets are opened.

In testimony whereof, I affix my signature in presence of two witnesses.

FOREST V. DETWILER.

Witnesses:
  JOHN A. BOMMHARDT,
  LOUIS A. MOSES.